(No Model.)
W. N. WHITELEY & W. BAYLEY.
TRACTION WHEEL FOR HARVESTERS.
No. 279,061. Patented June 5, 1883.
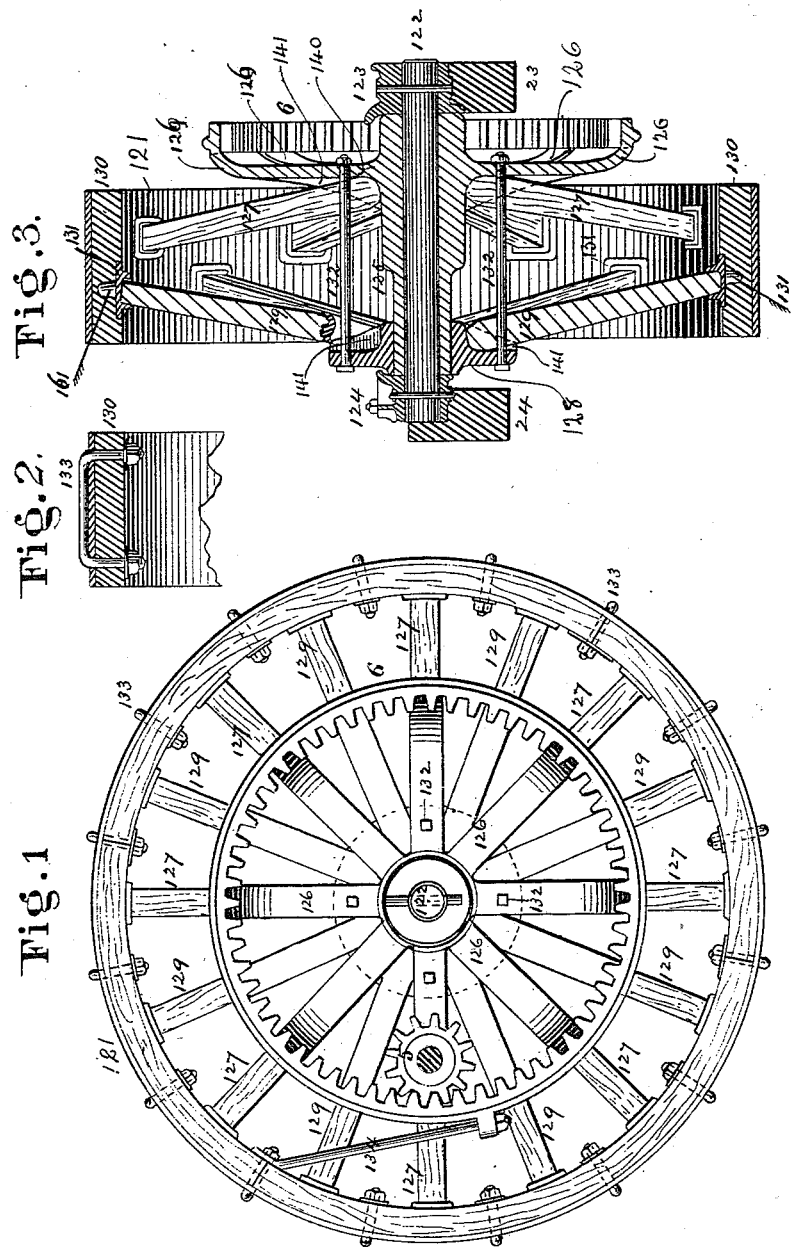
Witnesses
J. C. Turner
C. Clarence Poole
Inventors
W<sup>m</sup> N Whiteley
W<sup>m</sup> Bayley by their atty
R D O Smith

UNITED STATES PATENT OFFICE.

WILLIAM N. WHITELEY AND WILLIAM BAYLEY, OF SPRINGFIELD, OHIO.

TRACTION-WHEEL FOR HARVESTERS.

SPECIFICATION forming part of Letters Patent No. 279,061, dated June 5, 1883.

Application filed May 23, 1882. (No model.)

*To all whom it may concern:*

Be it known that we, WILLIAM N. WHITELEY and WILLIAM BAYLEY, of Springfield, in the county of Clarke and State of Ohio, have invented a new and useful Improvement in Traction-Wheels for Harvesters; and we do hereby declare that the following is a full and accurate description of the same.

This application forms a part of that which was filed January 30, 1882, and has been separated therefrom. This specification therefore includes matters originally shown and described in said application; but the portion intended to be included herein has exclusive reference to the main wheel of the harvester, and portions referring to the binder, to the main frame, and to the reel are reserved herefrom to form the subjects of other cases.

This invention therefore consists in a wheel the hub, spokes, and felly whereof are separable pieces, and a gear-ring attached to said wheel, with a tension stay-rod connecting said ring with the felly to relieve the spokes from strain.

That others may fully understand my invention, I will particularly describe it, having reference to the accompanying drawings, wherein—

Figure 1 is a side elevation of the wheel. Fig. 2 is a transverse section of the felly, showing the tire-stays. Fig. 3 is a transverse section of the wheel in the plane of the axis.

The master-wheel 121 is not adjustable, but runs loosely upon a stationary shaft, 122, said shaft being keyed to boxes 123 and 124, that are secured to the cross-ties 23 and 24 of the frame. Upon the shaft 122 there revolves an extended hub, 125, of the gear-ring 6. Around said hub, and extending up the spokes 127 of ring 6, are flanges 140, webs 141, extending in the direction of the axis, between which the inner ends of the spokes 127 are fitted and kept in place; and on the inner face of an adjustable disk, 128, are similar webs, which confine the inner ends of the spokes 129. The spokes 127 and 129 support the felly 130 and fit into metal sockets 131, anchored by pins 161, which penetrate into said felly. The adjustable disk 128 is drawn toward the arms 126 by draw-bolts 132, by which means the spokes may be thrust out and made tight against the felly. A wide wrought-metal tie covers the exterior surface of the felly, and is firmly secured to it by U-shaped bolts 133, secured by nuts inside the felly. The gear-ring 6 is attached to and supported by the hub 125 by arms 126, which support said ring independently of the spokes 129, and said ring is connected with the inner surface of the felly 130 by means of a strong metal rod, 134, whereby we are enabled to relieve the spokes from all torsional strain by using the rod to drive the felly and the spokes to support it and take the load.

Having described our invention, what we claim as new is—

A main wheel provided with a gear-wheel supported upon the same hub, combined with a tension-rod extending from the rim of the gear-wheel to the felly of the main wheel, whereby force applied to the felly is transmitted directly to the gear-wheel and the spokes and hub relieved from torsional strain.

W. N. WHITELEY.
WILLIAM BAYLEY.

Witnesses:
F. B. FURNISS,
W. T. STILLWELL.